United States Patent
Gu et al.

(10) Patent No.: US 8,073,064 B2
(45) Date of Patent: Dec. 6, 2011

(54) ROBUST FFT TRIGGER POINT TRACKING FOR ECHO CHANNELS IN OFDM BASED COMMUNICATION SYSTEMS

(75) Inventors: Yongru Gu, Lake Forest, CA (US); Jun Ma, Xian (CN)

(73) Assignee: Newport Media, Inc., Lake Forest, CA (US)

( * ) Notice: Subject to any disclaimer, the term of this patent is extended or adjusted under 35 U.S.C. 154(b) by 883 days.

(21) Appl. No.: 12/105,300

(22) Filed: Apr. 18, 2008

(65) Prior Publication Data

US 2009/0262842 A1 Oct. 22, 2009

(51) Int. Cl.
*H04K 1/10* (2006.01)
*H04L 27/28* (2006.01)

(52) U.S. Cl. .......... 375/260; 375/343; 375/355; 455/65; 455/296; 455/506

(58) Field of Classification Search .............. 375/260, 375/343, 355; 455/65, 296, 506
See application file for complete search history.

(56) References Cited

U.S. PATENT DOCUMENTS

| | | | | |
|---|---|---|---|---|
| 6,125,124 A | * | 9/2000 | Junell et al. | 370/503 |
| 6,192,059 B1 | * | 2/2001 | Karioja et al. | 372/20 |
| 7,177,376 B2 | * | 2/2007 | Atungsiri et al. | 375/343 |
| 7,336,598 B2 | * | 2/2008 | Kakura | 370/208 |
| 7,359,314 B2 | * | 4/2008 | Sakata et al. | 370/210 |
| 2005/0099936 A1 | * | 5/2005 | Fujii et al. | 370/203 |
| 2006/0222099 A1 | * | 10/2006 | Varadarajan et al. | 375/260 |
| 2006/0245349 A1 | * | 11/2006 | Vrcelj et al. | 370/210 |
| 2007/0092044 A1 | * | 4/2007 | Wang et al. | 375/343 |

* cited by examiner

*Primary Examiner* — Shuwang Liu
*Assistant Examiner* — Sung Ahn
(74) *Attorney, Agent, or Firm* — Rahman LLC

(57) ABSTRACT

Identifying a trigger point of at least one OFDM decoder includes correlating a first time-domain sample of the at least one OFDM symbol with a second time-domain sample of the at least one OFDM symbol, processing the first time-domain sample and the second time-domain sample in the first moving average filter to determine a channel impulse response, comparing at least one correlation value of a first biggest path in the channel impulse response and a second biggest path in the channel impulse response, and determining a channel length of the channel impulse response based on a time duration of the channel impulse response. The OFDM decoder includes a first moving average filter and a second moving average filter.

18 Claims, 7 Drawing Sheets

ROBUST FFT TRIGGER POINT TRACKING FOR ECHO CHANNELS IN OFDM BASED COMMUNICATION SYSTEMS

BACKGROUND

1. Technical Field

The embodiments herein generally relate to orthogonal frequency division multiplexing (OFDM) communication systems, and, more particularly, to a method and system for Fast Fourier Transform (FFT) trigger point tracking for channels in OFDM based communication systems.

2. Description of the Related Art

OFDM systems are used for transmitting digital signals. In OFDM systems, data is provided with a number of orthogonal sub carriers, and are assigned to the amplitude and the phase of each sub carrier to perform digital modulation. The OFDM systems have wide applications in digital terrestrial broadcasting. Standards employing the OFDM system for terrestrial broadcasting include Digital Video Broadcasting-Terrestrial (DVB-T), Integrated Services Digital Broadcasting-Terrestrial (ISDB-T), and Integrated Services Digital Broadcasting-Digital Sound Broadcasting (ISBD-TSB) among others.

In the existing OFDM systems, signals are transmitted in the form of OFDM symbols. To achieve transmission in orthogonal sub channels, an OFDM symbol in the frequency domain is converted to the time domain by applying an Inverse Fast Fourier Transform (IFFT) procedure. An OFDM symbol includes a valid symbol and a guard interval. The valid symbol is a signal period when IFFT is performed during transmission. To assure that orthogonality is maintained in dispersive channels, the guard interval is added to the resulting time domain sequence; i.e., the valid symbol.

The guard interval is a copy of the waveform of a part of the second half of the valid symbol and may have a time length of ¼ or ⅛ of that of the valid symbol. The guard interval is appended in the first half of the OFDM symbol. The time duration for which the guard interval occupies the OFDM symbol is known as $T_g$ (guard interval time). In existing OFDM systems, the guard interval should be at least as long as the duration (i.e., channel length) of the impulse response of the channel to ensure orthogonality. The impulse response of the channel (hereinafter referred to as "channel impulse response") is the delay response of the channel while processing an incoming OFDM symbol in frequency domain during its transmission.

The duration of the channel impulse response (i.e., channel length) is the time duration until the end of reception of an incoming OFDM symbol. In the existing OFDM systems, the channel impulse response is calculated by a moving average filter. The moving average filter has a fixed moving average window of $T_g$. The peak position of the moving average output of an OFDM symbol is the desired trigger point for the OFDM symbol. The occurrence of a trigger point is used by a receiver apparatus of the existing OFDM systems to start the process of de-modulation of the OFDM symbol by applying a FFT.

Usually, in the existing OFDM systems, like ISDB-T, ISDB-TSB, and DVB T/H the FFT trigger point tracking is based on the channel impulse response, with the channel length (or delay spread) of the channel impulse response being smaller than the guard interval. FIG. 1 illustrates a conventional system 100 for trigger point tracking in an OFDM system. The conventional system 100 includes a time-domain interpolator 102 for interpolating incoming OFDM symbols in the time domain to form a time-domain interpolated channel. Further, an inverse FFT block 104 performs an inverse FFT on the time-domain interpolated channel to obtain a channel impulse response.

Thereafter, the channel impulse response is fed to a moving average filter 106. The moving average filter 106 has a fixed moving average window size Tg, where Tg is the guard interval time for an OFDM system. The moving average filter 106 uses the $T_g$ to limit the time of processing of the OFDM symbols. A peak detection block 108 detects the peak position of the moving average output from the moving average (MA) filter 106. The peak position indicates the desired trigger point. However, in the existing OFDM systems, the trigger point may not be determined accurately for long channels. The long channels are prone to aliasing.

The aliasing causes the continuous signals in the long channels to become indistinguishable during processing by the moving average filter 106. Thereby, the channel impulse response detected by the moving average filter 106 for long channels may not represent the accurate channel impulse response. Since, the trigger point detection is based on the channel impulse response; an inaccurate channel impulse response may lead to errors in the detection of the trigger point for long channels. Additionally, the traditional design 100 may not detect the trigger point accurately in the long channels due to echo channels.

In some instances, echoes in long channels may occur outside the guard interval. In these instances the moving average filter 106 may process only the main path in the channel and may miss out on the echo channels. Since, the moving average filter 106 has a fixed moving average window size Tg, the moving average filter 106 may not detect the echo channels causing inferior trigger points and results in large inter-symbol interference.

SUMMARY

In view of the foregoing, an embodiment herein provides a method for identifying a trigger point of at least one OFDM decoder and a program storage device readable by computer, tangibly embodying a program of instructions executable by the computer to perform a method of a trigger point tracking for channels in a OFDM decoder. The method includes correlating a first time-domain sample of the at least one OFDM symbol with a second time-domain sample of the at least one OFDM symbol, processing the first time-domain sample and the second time-domain sample in the first moving average filter to determine a channel impulse response, comparing at least one correlation value of a first biggest path in the channel impulse response and a second biggest path in the channel impulse response, and determining a channel length of the channel impulse response based on a time duration of the channel impulse response. The OFDM decoder includes a first moving average filter and a second moving average filter. The first time-domain sample corresponds to a first time instance and the second time-domain sample corresponds to a second time instance. The second time instance precedes the first time instance.

The method further includes determining if a channel corresponding to the at least one OFDM symbol is at least one of a post-cursor channel or a pre-cursor channel based on a time of occurrence of the first biggest path and the second biggest path in the channel impulse response, and determining if a channel corresponding to the at least one OFDM symbol is an aliased channel. At least one of a first trigger point and a second trigger point may be identified. The first trigger point corresponds to the post-cursor channel and the second trigger point corresponds to the pre-cursor channel. The first trigger point corresponds to a beginning of a guard interval of the at least one OFDM symbol in the first biggest path. The second trigger point corresponds to a beginning of an effective portion of the at least one OFDM symbol in the first biggest path.

The first time-domain sample may be processed in the second moving average filter to determine a peak position in at least one output of the second moving average filter. The moving average size of the second moving average filter is adjusted based on the channel length of the channel response impulse. The moving average size is adjusted to at least one of: a value of $T_g$, if the channel length is less than $T_g$, and a value of the channel length, if the channel length is between the $T_g$ and a threshold value. The $T_g$ is equal to a length of a guard interval in the at least one OFDM symbol. The threshold value is greater than the $T_g$. The trigger point may be selected from at least one of the first trigger point and the second trigger point, if the channel length is more than the threshold value. The trigger point may be selected from at least one of the first trigger point and the second trigger point, if the channel length is more than the threshold value.

The trigger point may be selected based on the peak position in the at least one output if the channel length is less than a threshold value, wherein the threshold value is greater than $T_g$, wherein the $T_g$ is equal to a length of a guard interval in the at least one OFDM symbol. The trigger point may be selected from at least one of the first trigger point and the second trigger point, if the channel length is more than a threshold value, wherein the threshold value is greater than $T_g$, wherein the $T_g$ is equal to a length of a guard interval in the at least one OFDM symbol. The first time-domain sample may be processed in the second moving average filter to determine a peak position in at least one output of the second moving average filter if the channel length of the channel response is less than a threshold value. The threshold value is greater than $T_g$. The $T_g$ is equal to a length of a guard interval in the at least one OFDM symbol.

Another embodiment provides an OFDM decoder for identifying a trigger point of at least one OFDM symbol. The OFDM decoder includes a time-domain correlating unit, the time-domain correlation unit configured to correlate a first time-domain sample of the at least one OFDM symbol with a second time-domain time sample of the at least one OFDM symbol, a first moving average filter, the first moving average filter configured to process the first time-domain sample and the second time-domain sample to determine a channel impulse response, and a channel length and aliasing detection unit, the channel length and aliasing detection unit configured to compare at least one correlation value of a first biggest path in the channel impulse response and a second biggest path in the channel impulse, and determine a channel length of the channel impulse response based on a time duration of the channel impulse response.

The first time-domain sample corresponds to a first time instance and the second time-domain sample corresponds to a second time instance. The second time instance precedes the first time instance. The channel length and aliasing detection unit may be further configured to determine if a channel corresponding to the at least one OFDM symbol is at least one of a post-cursor channel and a pre-cursor channel based on a time of occurrence of the first biggest path and the second biggest path in the channel impulse response. The channel length and aliasing detection unit may be further configured to determine if a channel corresponding to the at least one OFDM symbol is an aliased channel. The channel length and aliasing detection unit is further configured to identify at least one of a first trigger point and a second trigger point. The first trigger point corresponds to the post-cursor channel and the second trigger point corresponds to the pre-cursor channel. The first trigger point corresponds to a beginning of a guard interval of the at least one OFDM symbol in the first biggest path. The second trigger point corresponds to the beginning of an effective portion of the at least one OFDM symbol in the first biggest path.

The OFDM decoder includes a second moving average filter, the second moving average filter configured to process the first time-domain sample. A peak detection unit configured to determine a peak position in at least one output of the second moving average filter. A moving average size of the second moving average filter is at least one of: a value of Tg, if the channel length is less than Tg, wherein the Tg is equal to a length of a guard interval in the at least one OFDM symbol, and a value of the channel length, if the channel length is between the Tg and a threshold value. The threshold value is greater than the $T_g$. A trigger point selection unit configured to perform at least one of: selecting the trigger point based on the peak position in at least one output if the channel length is less than the threshold value, and selecting the trigger point from at least one of the first trigger point and the second trigger point, if the channel length is more than the threshold value.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
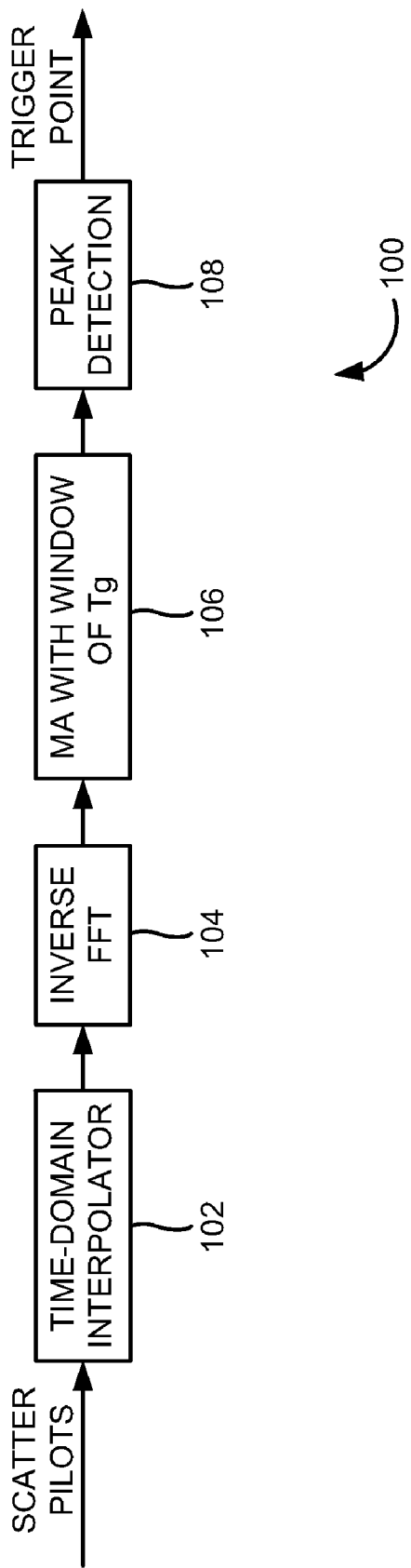
FIG. 1 is a block diagram illustrating a conventional system for trigger point tracking in an OFDM system.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide techniques for identifying the trigger point of OFDM symbols. An OFDM signal transmitted may include one or more OFDM symbols. The detection of the trigger point of the one or more OFDM symbols may be affected by aliasing and echo channels. Further the embodiments herein provide techniques for accurately identifying the trigger point of the one or more OFDM symbols in long channels and in the presence of echo channels. Referring now to the drawings, and more particularly to FIGS. 2 through 6, where similar reference characters denote corresponding features consistently throughout the figures, there are shown preferred embodiments.

Figure 2:
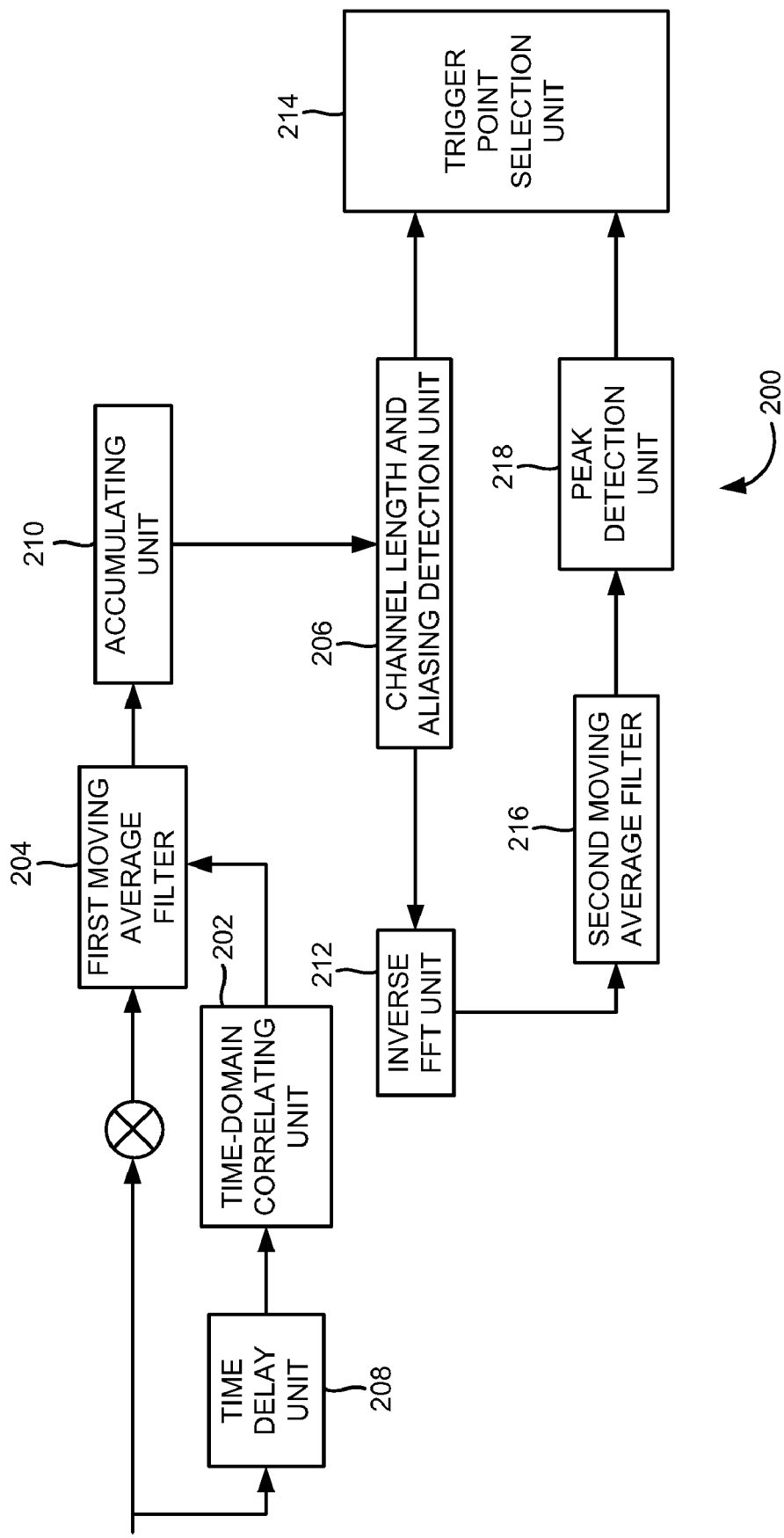
FIG. 2 is a block diagram showing various components of an OFDM decoder for trigger point tracking in OFDM based communication systems according to an embodiment herein.

FIG. 2 is a block diagram showing various components of an OFDM decoder for trigger point tracking an OFDM based communication systems according to an embodiment herein. The OFDM decoder 200 may be embodied as an ISDB-T decoder, ISDB-TSB decoder, or a DVB-T/H decoder among other embodiments. The OFDM decoder 200 includes a time-domain correlation unit 202, a first moving average filter 204, and a channel length and aliasing detection unit 206. The OFDM decoder 200 may further include a time delay unit 208. The OFDM decoder 200 may receive one or more OFDM symbols and send the one or more OFDM symbols to the time delay unit 208.

In response to receiving the one or more OFDM symbols, the time delay unit 208 may generate a first time-domain sample corresponding to the one or more OFDM symbols. The first time-domain sample corresponds to a first time instance. Further, the time delay unit 208 may generate a second time-domain sample corresponding to the one or more OFDM symbols. The second time-domain sample corresponds to a second time instance. The second time instance precedes the first time instance. The time delay unit 208 may transmit the first time-domain sample and the second time-domain sample to the time-domain correlating unit 202.

In response to receiving the first time-domain sample and the second time-domain sample, the time-domain correlating unit 202 correlates the first time-domain sample with the second time-domain sample to generate correlation results. After correlation, the time-domain correlating unit 202 transmits the first time-domain sample and the second time-domain sample along with the correlation results to the first moving average filter 204. The first moving average filter 204 has a fixed moving average size of $T_g$, where $T_g$ is equal to the guard interval time of the one or more OFDM symbols.

The first moving average filter 204 processes the first time-domain sample and the second time-domain sample to determine a channel impulse response corresponding to the one or more OFDM symbols. Further, the first moving average filter 204 may send an output of the first moving average filter 204, the correlation results, and the channel impulse response to an accumulating unit 210 of the OFDM decoder 200. The accumulating unit 210 accumulates the output of the first average filter 204 over a length of the first time instance and the second time instance along with the correlation results and the channel impulse response to obtain accumulated results.

The accumulated results are fed into the channel length and aliasing detection unit 206. In response to receiving the channel impulse and the correlation results, the channel length and aliasing detection unit 206 identifies a first biggest path and a second biggest path in the channel impulse response. In an embodiment herein, the channel length and aliasing detection unit 206 may use a predefined distance from the first biggest path to identify the second biggest path. The predefined distance may be fixed or dynamically configurable by software.

Further, the channel length and aliasing detection unit 206 may determine if the channel corresponding to the one or more OFDM symbols is at least one of a post-cursor channel and pre-cursor channel based on time of occurrences of the first biggest path and the second biggest path. In an embodiment herein, if the first biggest path precedes the second biggest path, the channel length and aliasing detection unit 206 identifies the channel corresponding to the one or more channels as post-cursor channel. In another embodiment, if the second biggest path succeeds the first biggest path in occurrence, the channel length and aliasing detection unit 206 identifies the channel corresponding to the one or more channels as a pre-cursor channel.

Thereafter, the channel length and aliasing detection unit 206 compares one or more correlation values of the first biggest path and the second biggest path. If there are no local peaks in the correlation results for the first biggest path and the second biggest path, but there are local peaks for a predetermined time interval before or after at least one of the first biggest path and the second biggest path, the channel length and aliasing detection unit 206 identifies the channel corresponding to one or more OFDM symbols as an aliased channel. The predetermined time interval may be $T_u/3$, where $T_u$ is the difference between the first time instance and the second time instance.

If the channel corresponding to the one or more OFDM symbols is an aliased channel, the channel length and aliasing detection unit 206 may identify one or more of a first trigger point and a second trigger point. In an embodiment herein, the first trigger point corresponds to the post-cursor channel and is identified by the channel length and aliasing detection unit 206 as the beginning of a guard interval of the one or more OFDM symbols in the first biggest path of the channel impulse response. In another embodiment, the second trigger point corresponds to the pre-cursor channel and is identified as the beginning of an effective portion of the one or more symbols in the first biggest path.

Thereafter, the channel length and aliasing detection unit 206 determines a time duration of channel impulse response as length of the channel impulse response. In response to determining the channel length, the channel length and aliasing detection unit 206 transmits the channel length and the first time-domain sample to one or more of an Inverse FFT unit 212 and a trigger point selection unit 214. Additionally, the channel length and aliasing detection unit 206 may also transmit the one or more of the first trigger point and the second trigger point to one or more of the IFFT unit 212 and the trigger point selection unit 214.

In an embodiment herein, the second moving average filter 216 processes the first time-domain sample to generate one or more outputs corresponding to the first time-domain sample. A moving average size of the second moving average filter 216 may be adjusted based on the channel length of the channel impulse response. For example, the moving average size may take a value of $T_g$, if the channel length of the channel impulse response is less than $T_g$, wherein the $T_g$ is equal to the length of a guard interval in the at least one OFDM symbol.

In another instance, the moving average size may take a value of the channel length of the channel impulse response, if the channel length is more than the $T_g$ but less than a threshold value W. The threshold value W is greater than the $T_g$ and may be a fixed value or be configurable by software. Alternatively, if the moving average size is $T_g$ for all other cases. A peak detection unit 218 receives the one or more outputs of the second moving average filter 216 and determines a peak position in the one or more outputs to detect the trigger point as the peak position.

Thereafter, the trigger point selection unit 214 detects the trigger point based on the channel length of the channel impulse response. For instance, if the channel length is less than the threshold value W, the trigger point selection unit 214 may select the trigger point detected by the peak detection unit 218. In another instance, if the channel length is more than the threshold value W, the trigger point selection unit 214 uses the input sent by the channel length and aliasing unit 206 to select at least one of the first trigger point and the second trigger point based on type of the channel; i.e., post-cursor channel or pre-cursor channel.

In one embodiment, the trigger point selection unit 214 may receive the channel length from the channel length and aliasing detection unit 206 before initiation of processing of the first time-domain sample by the second moving average filter 216. The trigger point selection unit 214 may compare the channel length with the threshold value W. If the channel length is more than the threshold value W, the trigger point selection unit 214 selects at least one of the first trigger point and the second trigger point based on the type of channel.

Figure 3:
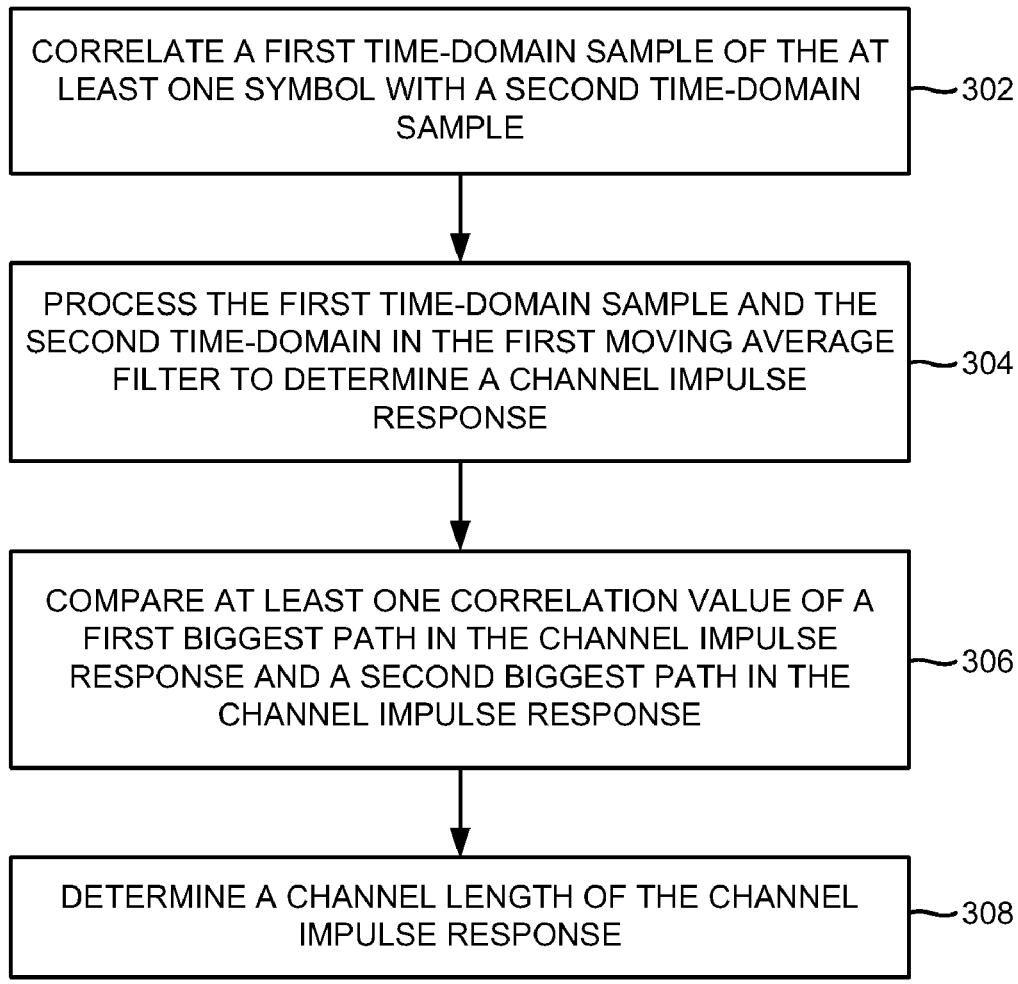
FIG. 3 is a flow diagram illustrating a method for identifying a trigger point in an OFDM decoder according to an embodiment herein.

FIG. 3, with reference to FIG. 2, is a flow diagram illustrating a method for identifying a trigger point in an OFDM decoder 200, according to an embodiment herein. A transmitter (not shown) sends one or more OFDM symbols to the OFDM decoder 200. At step 302, a first time-domain sample of the one or more OFDM symbols is correlated with a second time-domain sample. The first time-domain sample corresponds to a first time instance. The second time-domain sample corresponds to the second time instance. Further, the second time instance precedes the first time instance. For instance, the time-domain correlating unit 202 of correlates the first time-domain sample with the second time-domain sample to generate correlation results.

In response to the correlating, at step 304 the first time-domain sample and the second time-domain sample are processed by a first moving average filter 204 to determine the channel impulse response corresponding to the one or more OFDM symbols. For instance, the first moving average filter 204 processes the first time-domain sample and the second time-domain sample to determine the channel impulse response corresponding to the one or more OFDM symbols. Thereafter, a first biggest path and a second biggest path in the channel impulse response are identified. At step 306, one or more correlation values of the first biggest path and the second biggest path are compared.

For example, the channel length and aliasing detection unit 206 compares one or more correlation values of the first biggest path and the second biggest path. At step 308, a channel length of the channel impulse response is determined based on a time duration of the channel impulse response. For instance, the channel length and aliasing detection unit 206 determines length of the channel impulse response.

Figure 4A:
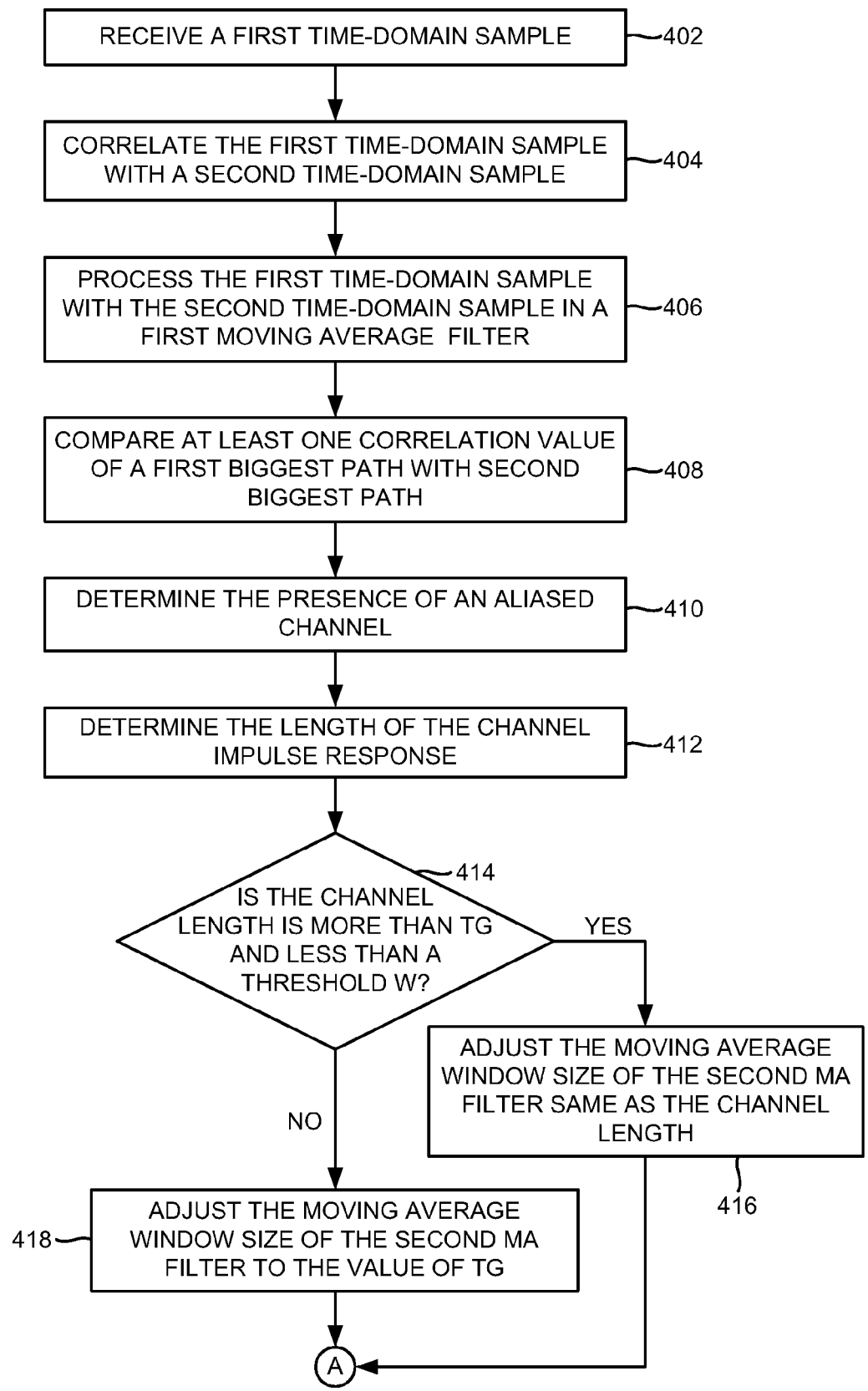
FIGS. 4A and 4B are flow diagrams illustrating a method for identifying a trigger point in an OFDM decoder in according to an embodiment herein.
Figure 4B:
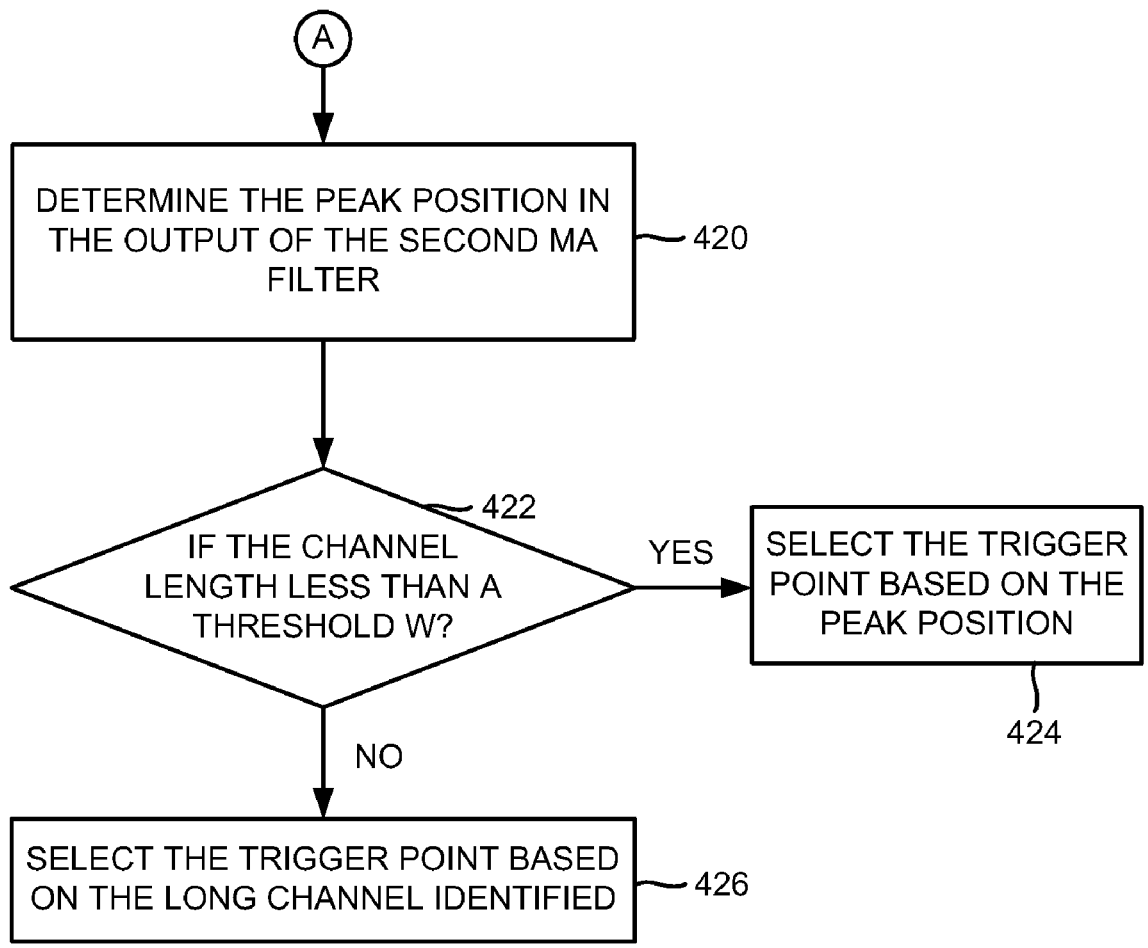

FIGS. 4A and 4B, with reference to FIG. 2, are flow diagrams illustrating a method of identifying a trigger point in an OFDM decoder 200, according to an embodiment herein. A transmitter (not shown) sends one or more OFDM symbols to the OFDM decoder 200. The OFDM decoder 200 includes a first moving average filter 204 and a second moving average filter 216.

The OFDM decoder 200 receives one or more OFDM symbols and sends the one or more OFDM symbols to the time delay unit 208. In response to receiving the one or more OFDM symbols, the time delay unit 208 generates a first time-domain sample corresponding to the one or more OFDM symbols. The first time-domain sample corresponds to a first time instance. Further, the time delay unit 208 may generate a second time-domain sample corresponding to the one or more OFDM symbols. The second time-domain sample corresponds to a second time instance. The second time instance precedes the first time instance.

The time delay unit 208 may transmit the first time-domain sample and the second time-domain sample to the time-domain correlating unit 202. At step 402, the time-domain correlating unit 202 receives the first time-domain sample. In response to receiving the first time-domain sample and the second time-domain sample, the time-domain correlating unit 202, at step 404 correlates the first time-domain sample with the second time-domain sample to generate correlation results. After correlation, the time-domain correlating unit 202 transmits the first time-domain sample and the second time-domain sample along with the correlation results to the first moving average filter 204.

The first moving average filter 204 has a fixed moving average size of $T_g$, where $T_g$ is equal to the guard interval time of the one or more OFDM symbols. In response to receiving the first time-domain sample and the second time-domain sample along with the correlation results, at step 406, the first moving average filter 204 processes the first time-domain sample and the second time-domain sample to determine a channel impulse response corresponding to the one or more OFDM symbols. Further, the first moving average filter 204 may send output of the first moving average filter 204, the correlation results and the channel impulse response to an accumulating unit 210 of the OFDM decoder 200.

The accumulating unit 210 accumulates the output of the first average filter 204 over a length of the first time instance and the second time instance along with the correlation results and the channel response to obtain accumulated results. The accumulated results may be fed into the channel length and aliasing detection unit 206. In response to receiving the channel impulse and the correlation results, the channel length and aliasing detection unit 206 identifies a first biggest path and a second biggest path in the channel impulse response. In an embodiment herein, the channel length and aliasing detection unit 206 may use a predefined distance from the first biggest path to identify the second biggest path.

The predefined distance may be fixed or dynamically configurable by software. Further, the channel length and aliasing detection unit 206 may determine if the channel corresponding to the one or more OFDM symbols is at least one of a post-cursor channel and pre-cursor channel based on time of occurrences of the first biggest path and the second biggest path. In an embodiment herein, if the first biggest path precedes the second biggest path, the channel length and aliasing detection unit 206 identifies the channel corresponding to the one or more channels as a post-cursor channel.

In another embodiment, if the second biggest path succeeds the first biggest path in occurrence, the channel length and aliasing detection unit 206 identifies the channel corresponding to the one or more channels as a pre-cursor channel. Thereafter, at step 408 the channel length and aliasing detection unit 206 compares one or more correlation values of the first biggest path and the second biggest path. If there are no local peaks in the correlation results for the first biggest path and the second biggest path, but there are local peaks for a predetermined time interval before or after at least one of the first biggest path and the second biggest path, the channel length and aliasing detection unit 206, at step 410 identifies the channel corresponding to one or more OFDM symbols as an aliased channel.

The predetermined time interval may be $T_u/3$, where $T_u$ is the difference between the first time instance and the second time instance. Further, if the channel corresponding to the one or more OFDM symbols is an aliased channel, the channel length and aliasing detection unit 206 identifies one or more of a first trigger point and a second trigger point. In an embodiment herein, the first trigger point corresponds to the post-cursor channel and is identified by the channel length and aliasing detection unit 206 as the beginning of a guard interval of the one or more OFDM symbols in the first biggest path of the channel impulse response.

In another embodiment, the second trigger point corresponds to the pre-cursor channel and is identified as the beginning of an effective portion of the one or more symbols in the first biggest path. Thereafter, at step 412 the channel length and aliasing detection unit 206 determines the length of the channel impulse response based on the time duration of the channel impulse response. In response to determining the length, the channel length and aliasing detection unit 206 transmits the channel length and the first time-domain sample to one or more of the IFFT unit 212 and a trigger point selection unit 214 of the OFDM decoder 200.

Additionally, the channel length and aliasing detection unit 206 may also transmit the one or more of the first trigger point and the second trigger point to one or more of the IFFT unit 212 and the trigger point selection unit 214. At step 414, a decision is performed to determine if the channel length is greater than $T_g$, and less than a threshold value W. The threshold value W is greater than the $T_g$ and may be a fixed value or be configurable by software. If the channel length is greater than $T_g$, and less than a threshold value W (Yes) then at step 416, the moving average size of the second moving average filter 216 takes a value of the channel length of the channel impulse response.

Similarly, if the channel length of the channel impulse response is less than $T_g$ (No) then at step 418 the moving average size of the second moving average filter 216 takes a value of $T_g$. Alternatively, the moving average size is $T_g$ for all other cases. Thereafter, the second moving average filter 216 processes the first time-domain sample to generate one or more outputs corresponding to the first time-domain sample. At step 420, the peak detection unit 218 receives the one or more outputs of the second moving average filter 216 and determines a peak position in the one or more outputs to detect the trigger point as the peak position. Thereafter, the trigger point selection unit 214 detects the trigger point based on the channel length of the channel impulse response.

At step 422, the trigger point selection unit 214 checks if the channel length is less than the threshold value W. If the channel length is less than the threshold value W (Yes), then at step 424 the trigger point selection unit 214 selects the trigger point detected by the peak detection unit 218. If the channel length is more than the threshold value W (No), the trigger point selection unit 214 at step 426 uses the input sent by the channel length and aliasing unit 206 to select at least one of the first trigger point and the second trigger point based on type of the long channel identified (e.g., post-cursor channel or pre-cursor channel).

In another embodiment, the trigger point selection unit 214 at step 412 receives the channel length from the channel length and aliasing unit 206 before initiation of processing of the first time-domain sample by the second moving average filter 216. The trigger point selection unit 214 may compare the channel length with the threshold value W. If the channel length is more than the threshold value W, the trigger point selection unit 214 selects at least one of the first trigger point and the second trigger point based on the type of long channel.

Figure 5:
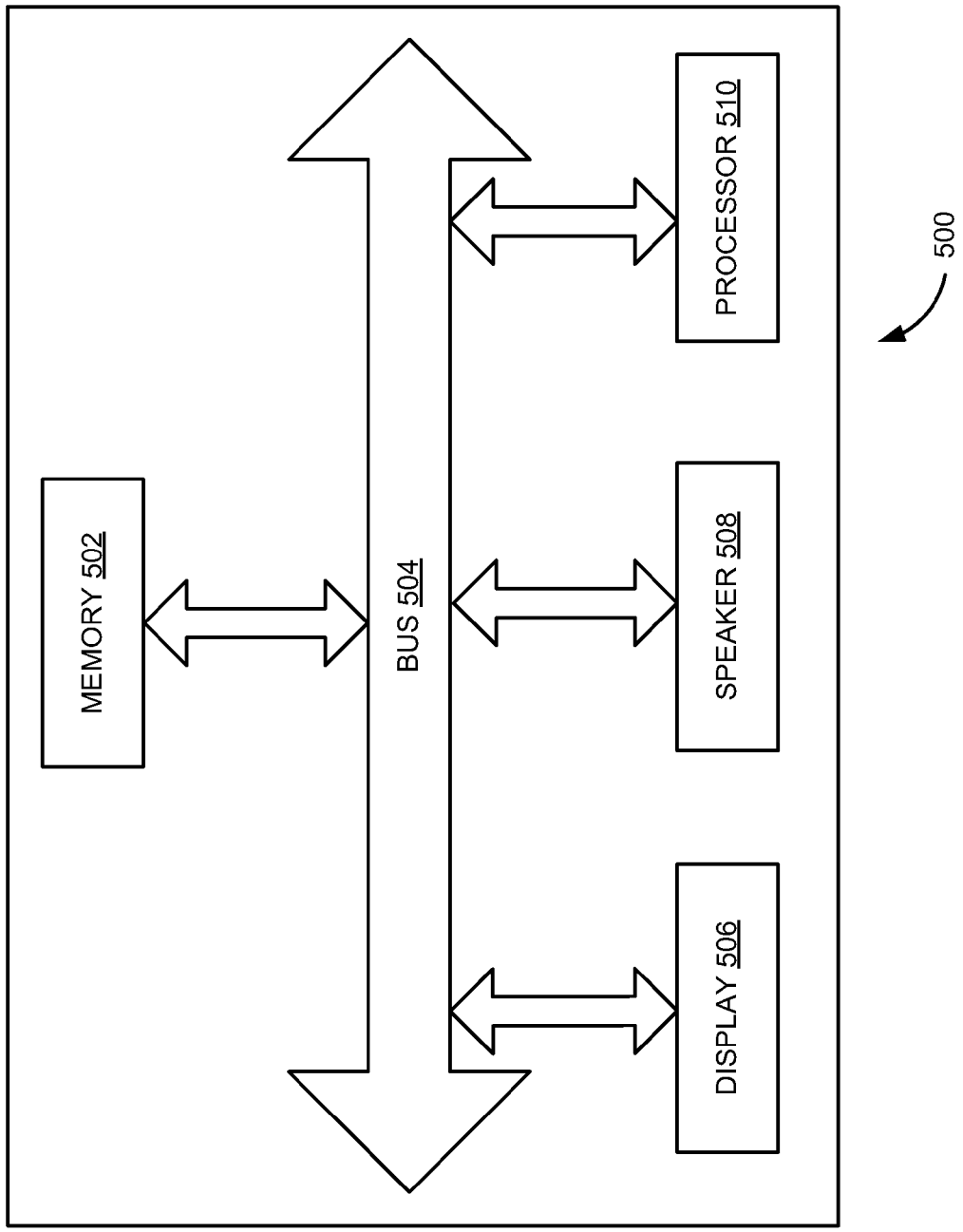
FIG. 5 illustrates an exploded view of a mobile TV receiver according to an embodiment herein.

FIG. 5 illustrates an exploded view of a mobile TV receiver 500 having a memory 502 with a computer set of instructions, a bus 504, a display 506, a speaker 508, and a processor 510 capable of processing the set of instructions to perform any one or more of the methodologies herein, according to an embodiment herein.

The processor 510 may also enable frequency samples to be consumed in the form of one or more displays 506 or audio for output via speaker and/or earphones 508. The processor 510 may also carry out the methods described herein and in accordance with the embodiments herein. The received frequency domain sample may also be stored in the memory 502 for future processing or consumption. The memory 502 may also store specific information about the frequency domain sample available in the future or stored from the past. When the sample is selected, the processor 510 may pass information. The information may be passed among functions within mobile TV receiver 500 using the bus 504.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
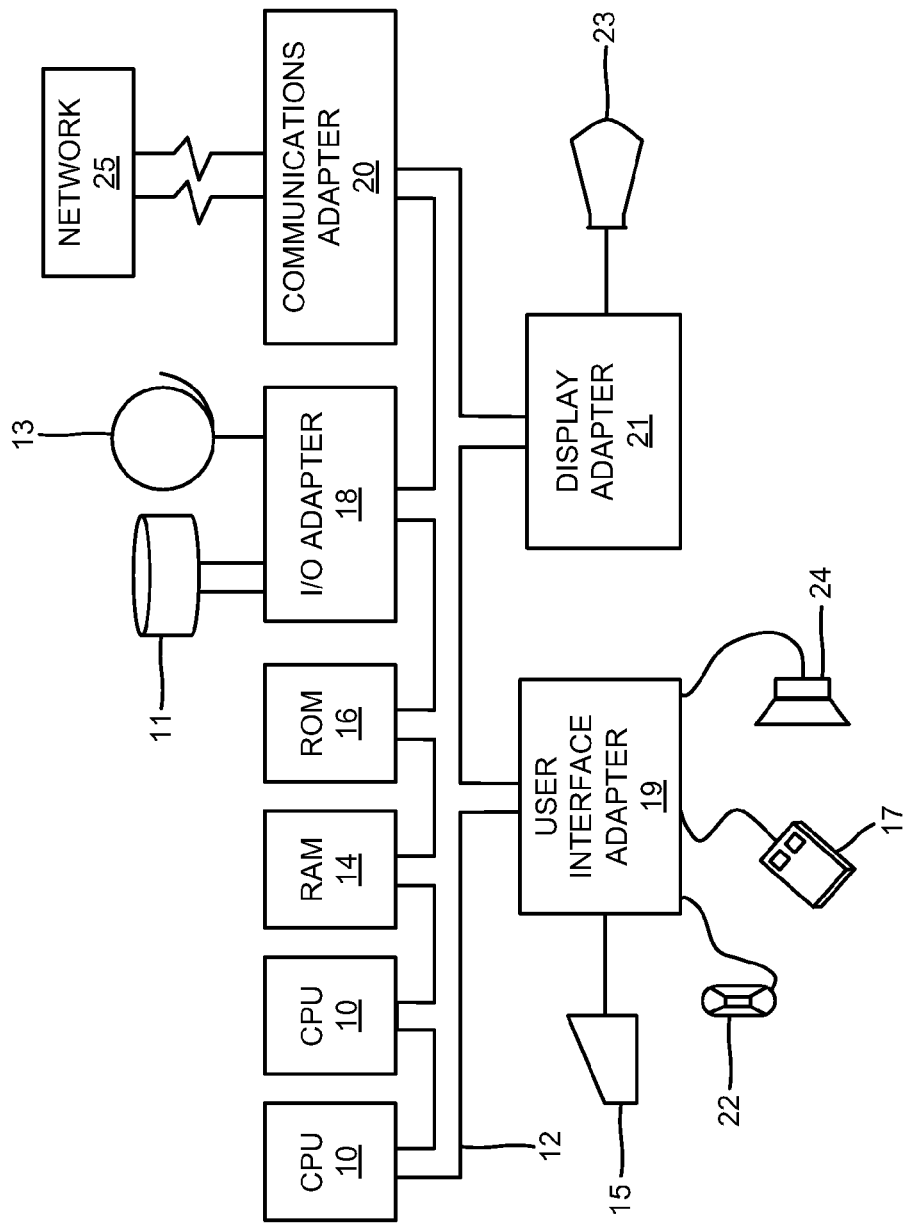
FIG. 6 illustrates a schematic diagram of a computer architecture according to an embodiment herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Various embodiments herein provide techniques for robustly identifying trigger points in OFDM based communication systems. Additionally, the embodiments herein provide techniques for reducing the impact of aliasing on long channels during detection of the trigger points in OFDM based communication systems. Further, the various embodiments herein provide techniques for accurately detecting trigger point of OFDM symbols in presence of echo channels.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for identifying a trigger point of at least one orthogonal frequency division multiplexing (OFDM) decoder, wherein said OFDM decoder comprises a first moving average filter and a second moving average filter, said method comprising:
   correlating a first time-domain sample of said at least one OFDM symbol with a second time-domain sample of said at least one OFDM symbol, wherein said first time-domain sample corresponds to a first time instance and said second time-domain sample corresponds to a second time instance, wherein said second time instance precedes said first time instance;
   processing said first time-domain sample and said second time-domain sample in said first moving average filter to determine a channel impulse response;
   comparing at least one correlation value of a first biggest path in said channel impulse response and a second biggest path in said channel impulse response;
   determining a channel length of said channel impulse response based on a time duration of said channel impulse response;
   determining if a channel corresponding to said at least one OFDM symbol is at least one of a post-cursor channel or a pre-cursor channel based on a time of occurrence of said first biggest path and said second biggest path in said channel impulse response;
   determining if a channel corresponding to said at least one OFDM symbol is an aliased channel;
   identifying at least one of a first trigger point and a second trigger point, wherein said first trigger point corresponds to said post-cursor channel and said second trigger point corresponds to said pre-cursor channel, wherein said first trigger point corresponds to a beginning of a guard interval of said at least one OFDM symbol in said first biggest path, and wherein said second trigger point corresponds to a beginning of an effective portion of said at least one OFDM symbol in said first biggest path; and
   selecting said trigger point from at least one of said first trigger point and said second trigger point, if said channel length is more than a threshold value, wherein said threshold value is greater than $T_g$, wherein said $T_g$ is equal to a length of a guard interval in said at least one OFDM symbol.

2. The method of claim 1, further comprising processing said first time-domain sample in said second moving average filter to determine a peak position in at least one output of said second moving average filter.

3. The method of claim 2, wherein said moving average size of said second moving average filter is adjusted based on said channel length of said channel response impulse.

4. The method of claim 3, wherein said moving average size is adjusted to at least one of:
   a value of $T_g$, if said channel length is less than $T_g$, wherein said $T_g$ is equal to a length of a guard interval in said at least one OFDM symbol; and a value of the channel length, if said channel length is between said $T_g$ and said threshold value, wherein said threshold value is greater than said $T_g$.

5. The method of claim 1, wherein said OFDM decoder comprises any of an ISDB-T decoder, ISDB-TSB decoder, and a DVB-T/H decoder.

6. The method of claim 2, further comprising selecting said trigger point based on said peak position in said at least one output if said channel length is less than said threshold value, wherein said threshold value is greater than $T_g$, wherein said $T_g$ is equal to a length of a guard interval in said at least one OFDM symbol.

7. The method of claim 1, further comprising processing said first time-domain sample in said second moving average filter to determine a peak position in at least one output of said second moving average filter if said channel length of said channel response is less than said threshold value, wherein said threshold value is greater than $T_g$, wherein said $T_g$ is equal to a length of a guard interval in said at least one OFDM symbol.

8. An orthogonal frequency division multiplexing (OFDM) decoder for identifying a trigger point of at least one OFDM symbol, wherein said OFDM decoder comprises:
   a time-domain correlating unit, said time-domain correlation unit configured to correlate a first time-domain sample of said at least one OFDM symbol with a second time-domain time sample of said at least one OFDM symbol, wherein said first time-domain sample corresponds to a first time instance and said second time-domain sample corresponds to a second time instance, wherein said second time instance precedes said first time instance;
   a first moving average filter, said first moving average filter configured to process said first time-domain sample and said second time-domain sample to determine a channel impulse response;
   a channel length and aliasing detection unit, said channel length and aliasing detection unit configured to compare at least one correlation value of a first biggest path in the channel impulse response and a second biggest path in said channel impulse, and determine a channel length of said channel impulse response based on a time duration of said channel impulse response;
   a second moving average filter, said second moving average filter configured to process said first time-domain sample, wherein a moving average size of said second moving average filter is at least one of:
      a value of $T_g$, if said channel length is less than $T_g$, wherein said $T_g$ is equal to a length of a guard interval in said at least one OFDM symbol; and
      a value of said channel length, if said channel length is between said $T_g$ and a threshold value, wherein said threshold value is greater than said $T_g$;
   a peak detection unit configured to determine a peak position in at least one output of said second moving average filter; and
   a trigger point selection unit that selects a trigger point, said trigger point selection unit configured to perform at least one of:
      selecting said trigger point based on said peak position in at least one output if said channel length is less than said threshold value; and
      selecting said trigger point from at least one of a first trigger point and a second trigger point, if said channel length is more than said threshold value, wherein the first and second trigger points correspond with respective portions of said OFDM symbol in said first biggest path.

9. The orthogonal frequency division multiplexing (OFDM) decoder of claim 8, wherein said channel length and aliasing detection unit is further configured to determine if a channel corresponding to said at least one OFDM symbol is at least one of a post-cursor channel and a pre-cursor channel based on a time of occurrence of said first biggest path and said second biggest path in said channel impulse response.

10. The orthogonal frequency division multiplexing (OFDM) decoder of claim 9, wherein said channel length and aliasing detection unit is further configured to determine if a channel corresponding to said at least one OFDM symbol is an aliased channel.

11. The orthogonal frequency division multiplexing (OFDM) decoder of claim 10, wherein said channel length and aliasing detection unit is further configured to identify at least one of said first trigger point and said second trigger point, wherein said first trigger point corresponds to said post-cursor channel and said second trigger point corresponds to said pre-cursor channel, wherein said first trigger point corresponds to a beginning of a guard interval of said at least one OFDM symbol in said first biggest path, wherein said second trigger point corresponds to said beginning of an effective portion of said at least one OFDM symbol in said first biggest path.

12. A method for identifying a trigger point of at least one orthogonal frequency division multiplexing (OFDM) decoder, wherein said OFDM decoder comprises a first moving average filter and a second moving average filter, said method comprising:
   correlating a first time-domain sample of said at least one OFDM symbol with a second time-domain sample of said at least one OFDM symbol, wherein said first time-domain sample corresponds to a first time instance and said second time-domain sample corresponds to a second time instance, wherein said second time instance precedes said first time instance;
   processing said first time-domain sample and said second time-domain sample in said first moving average filter to determine a channel impulse response;
   comparing at least one correlation value of a first biggest path in said channel impulse response and a second biggest path in said channel impulse response;
   determining a channel length of said channel impulse response based on a time duration of said channel impulse response;
   determining if a channel corresponding to said at least one OFDM symbol is at least one of a post-cursor channel or a pre-cursor channel based on a time of occurrence of said first biggest path and said second biggest path in said channel impulse response;
   determining if a channel corresponding to said at least one OFDM symbol is an aliased channel;
   identifying at least one of a first trigger point and a second trigger point, wherein said first trigger point corresponds to said post-cursor channel and said second trigger point corresponds to said pre-cursor channel, wherein said first trigger point corresponds to a beginning of a guard interval of said at least one OFDM symbol in said first biggest path, wherein said second trigger point corresponds to a beginning of an effective portion of said at least one OFDM symbol in said first biggest path;

processing said first time-domain sample in said second moving average filter to determine a peak position in at least one output of said second moving average filter; and selecting said trigger point based on said peak position in said at least one output if said channel length is less than a threshold value, wherein said threshold value is greater than $T_g$, wherein said $T_g$ is equal to a length of a guard interval in said at least one OFDM symbol.

13. The method of claim 12, wherein said moving average size of said second moving average filter is adjusted based on said channel length of said channel response impulse.

14. The method of claim 13, wherein said moving average size is adjusted to at least one of:

a value of $T_g$, if said channel length is less than $T_g$, wherein said $T_g$ is equal to a length of a guard interval in said at least one OFDM symbol; and a value of the channel length, if said channel length is between said $T_g$ and said threshold value, wherein said threshold value is greater than said $T_g$.

15. The method of claim 14, further comprising selecting said trigger point from at least one of said first trigger point and said second trigger point, if said channel length is more than said threshold value.

16. The method of claim 12, further comprising selecting said trigger point from at least one of said first trigger point and said second trigger point, if said channel length is more than said threshold value, wherein said threshold value is greater than $T_g$, wherein said $T_g$ is equal to a length of a guard interval in said at least one OFDM symbol.

17. The method of claim 12, further comprising processing said first time-domain sample in said second moving average filter to determine a peak position in at least one output of said second moving average filter if said channel length of said channel response is less than said threshold value, wherein said threshold value is greater than $T_g$, wherein said $T_g$ is equal to a length of a guard interval in said at least one OFDM symbol.

18. The method of claim 12, wherein said OFDM decoder comprises any of an ISDB-T decoder, ISDB-TSB decoder, and a DVB-T/H decoder.

\* \* \* \* \*